United States Patent
Fischereder et al.

(10) Patent No.: US 10,507,505 B2
(45) Date of Patent: Dec. 17, 2019

(54) BENDING PRESS AND/OR LOADING DEVICE

(71) Applicant: TRUMPF Maschinen Austria GmbH & Co. KG., Pasching (AT)

(72) Inventors: Bernhard Fischereder, Ottnang am Hausruck (AT); Alfred Haselboeck, Rohrbach (AT); Gerhard Sperrer, Oberschlierbach (AT)

(73) Assignee: TRUMPF Maschinen Austria GmbH & Co. KG., Pasching (AT)

( * ) Notice: Subject to any disclaimer, the term of this patent is extended or adjusted under 35 U.S.C. 154(b) by 226 days.

(21) Appl. No.: 15/525,392

(22) PCT Filed: Nov. 10, 2015

(86) PCT No.: PCT/AT2015/050286
§ 371 (c)(1),
(2) Date: May 9, 2017

(87) PCT Pub. No.: WO2016/074010
PCT Pub. Date: May 19, 2016

(65) Prior Publication Data
US 2017/0312800 A1   Nov. 2, 2017

(30) Foreign Application Priority Data

Nov. 10, 2014   (DE) .................. 10 2014 116 386

(51) Int. Cl.
*B23Q 3/155*   (2006.01)
*B21D 5/04*   (2006.01)
(Continued)

(52) U.S. Cl.
CPC ......... *B21D 5/0254* (2013.01); *B21D 5/0236* (2013.01); *B21D 5/0281* (2013.01);
(Continued)

(58) Field of Classification Search
CPC ........ Y10T 483/1729; Y10T 483/1731; B23Q 3/155–3/15793; B21D 5/0254; B21D 37/145
(Continued)

(56) References Cited

U.S. PATENT DOCUMENTS 4,089,198 A   5/1978   Amano et al.
4,449,907 A   5/1984   Yonezawa et al.
(Continued)

FOREIGN PATENT DOCUMENTS

AT   516624 A4 *   7/2016
CN   1402657 A   3/2003
(Continued)

OTHER PUBLICATIONS

Machine translation of DE 2844867, which DE '867 was published Apr. 1980.*
(Continued)

*Primary Examiner* — Erica E Cadugan
(74) *Attorney, Agent, or Firm* — Collard & Roe, P.C.

(57) ABSTRACT

The invention relates to a bending press (1) and/or a loading device (2) for loading a bending press (1) with bending tools (5, 6), comprising:
at least one tool holder (3, 4; 13, 14) with a rail (7) having an inner profile (8) for receiving and displacing a bending tool (5, 6), at least one internal wall (9) of the rail (7) forming a guide structure (10) extending in the longitudinal direction of the rail (7); and
at least one transfer device (15) drivable by a drive (21) for displacing a bending tool (5, 6) within the tool holder (3, 4; 13, 14) and/or between the tool holder (13, 14) of the loading device (2) and a tool holder (3, 4) of
(Continued)

a bending press (1), wherein at least one portion of the transfer device (15) is guided by the guide structure (10) formed in the rail (7).

33 Claims, 5 Drawing Sheets

(51) Int. Cl.
  *B21D 37/04* (2006.01)
  *B21D 5/02* (2006.01)
  *B21D 37/14* (2006.01)
(52) U.S. Cl.
  CPC ........... *B21D 37/04* (2013.01); *B21D 37/145* (2013.01); *B23Q 3/1556* (2013.01); *B23Q 2003/1553* (2016.11); *Y10T 483/1731* (2015.01); *Y10T 483/1827* (2015.01)
(58) Field of Classification Search
  USPC ..................................................... 483/28–29
  See application file for complete search history.

(56) References Cited

U.S. PATENT DOCUMENTS

| | | | |
|---|---|---|---|
| 5,168,745 | A | 12/1992 | Miyagawa et al. |
| 6,024,681 | A | 2/2000 | Latten et al. |
| 7,168,286 | B1 | 1/2007 | Pelech |
| 2003/0005744 | A1 | 1/2003 | Gasparini |
| 2004/0035178 | A1 | 2/2004 | Matsumoto et al. |
| 2008/0043238 | A1 | 2/2008 | Bruggink |
| 2009/0139296 | A1 | 6/2009 | McCauley |
| 2017/0320123 | A1* | 11/2017 | Cavicchia ............ B21D 5/0236 |
| 2018/0193896 | A1* | 7/2018 | Haselboeck ......... B21D 5/0254 |
| 2018/0304331 | A1* | 10/2018 | Cavicchia ............ B21D 5/0254 |

FOREIGN PATENT DOCUMENTS

| | | |
|---|---|---|
| CN | 1455710 A | 11/2003 |
| CN | 103278184 A | 9/2013 |
| CN | 104105555 A | 10/2014 |
| DE | 2844867 A * | 4/1980 |
| DE | 33 26 067 A1 | 1/1985 |
| DE | 35 46 876 C2 | 7/1997 |
| EP | 0 310 145 A2 | 4/1989 |
| EP | 2 719 476 A1 | 4/2014 |
| EP | 3338906 A1 * | 6/2018 |
| EP | 3354363 A1 * | 8/2018 |
| FR | 2 317 027 A1 | 2/1977 |
| JP | S57-181725 A | 11/1982 |
| JP | S60-244426 A | 12/1985 |
| JP | 62-057717 A * | 3/1987 |
| JP | H02-268922 A | 11/1990 |
| JP | H03-18924 U | 2/1991 |
| JP | H05-84414 U | 11/1993 |
| JP | H07-116734 A | 5/1995 |
| JP | H10-230399 A | 9/1998 |
| JP | 2001150032 A | 6/2001 |
| JP | 2003-211223 A | 7/2003 |
| JP | 2004358533 A | 12/2004 |
| JP | 2013-173172 A | 9/2013 |
| WO | 2012/083332 A1 | 6/2012 |
| WO | WO-2016/109862 A1 * | 7/2016 |
| WO | WO-2017/004649 A1 * | 1/2017 |
| WO | WO-2017/152207 A1 * | 9/2017 |
| WO | WO-2018/145137 A1 * | 8/2018 |

OTHER PUBLICATIONS

Letter to Austrian Patent Attorney to European Patent Office in PCT/AT2015/050286, dated Sep. 9, 2016.
International Search Report of PCT/AT2015/050287, dated Mar. 29, 2016.
Letter of Austrian Patent Attorney to European Patent Office in PCT/AT2015/050287, dated Sep. 9, 2016.
International Search Report of PCT/AT2015/050286, dated Mar. 29, 2016.
Office Action in Japanese Patent Application No. 2017-525027 dated Jul. 30, 2019.

* cited by examiner

BENDING PRESS AND/OR LOADING DEVICE

This application is the National Stage of PCT/AT2015/050286 filed on Nov. 10, 2015, which claims priority under 35 U.S.C. § 119 of German Application No. 10 2014 116 386.9 filed on Nov. 10, 2014. The international application under PCT article 21(2) was not published in English.

The invention relates to a bending press and/or loading device and a method for loading a bending press with bending tools and/or for changing one or more bending tools inserted in a bending press using a loading device.

Automation and the reduction of cycle times are important aspects in connection with bending operations carried out on different workpieces to be formed. One approach to achieving these aims is to automate the process of changing the bending tools inserted in a bending press using a tool changer provided separately for this purpose.

The most relevant prior art is JPH0584414U. This publication discloses a tool changer comprising a tool magazine made up of a number of circulating tool holders. A tool set comprising an upper tool and lower tool is held in every tool holder. In order to transfer a tool from the tool magazine to the bending press, the corresponding tool holder is moved to a specific position and moves a driven chain out. A shuttle attached to the front end of the chain has a mechanical docking device or coupling which is docked on the tool and pushes it into the bending press. The coupling comprises a projection which moves into an orifice of the tool. Separate chains with co-operating docking devices are provided respectively for the upper and lower tool. In the retracted state, the chain is disposed in a spiral shape. The chain guide for both the lower and upper tool extends entirely outside the tool holder. Such a construction is complex and expensive, not least in terms of guiding the chain. The chain guide is susceptible to dirt and occupies an excessive amount of space precisely in the area which needs to be accessible and free of obstacles when it comes to optimum operation and positioning of the workpiece.

DE3326067A1 discloses a mold changing apparatus for molding machines, in particular injection casting machines. The pairs of mold halves are moved in and out of the injection casting machine on so-called roller carriages or roller transfer devices. The pairs of mold halves are transferred from the roller carriages onto the roller transfer devices (and vice versa) by means of a pull-push device. The pull-push device comprises a drive and a steel chain which can be set in a pushing-pulling motion by means of the drive. A hook is provided on the front end of the steel chain for coupling with the pair of mold halves. This construction is very different from a bending press; implementing this system in a bending press would not only be very complex but would effectively require a totally different design of the bending press.

JPS57181725A discloses an automatic tool changing device for a bending press. A tool storage is provided in the form of a drum of a larger diameter and a drum of smaller diameter. In order to set up the bending press with a specific tool, the drum is firstly moved into a corresponding rotational position and the selected tool is then conveyed into the bending press by means of a carriage along a guide separately provided for the latter. A driven chain is also used as a pull-push device in this instance. Here too, the disposition of the guide system is impractical. If providing displaceable back gauges, the options are severely limited due to lack of space and there is a risk of collisions. Due to the fact that the guides are difficult to access, fitting, maintenance and repairs are very complicated. It is not possible to retro-fit existing systems with a tool changing system.

JPS60244426A discloses a tool changer for a bending machine but contains no teaching as to the detailed construction of the tool changer.

What has proved to be problematic with the prior art in terms of a tool changing system in particular is the complicated and expensive construction needed to feed in the bending tools. The partially exposed mounting of the chain and shuttle guides requires a lot of space and is vulnerable to external influences, such as dirt, impacts and collisions with other movable components, e.g. stops, sensors, etc. Particularly problematic is the fact that existing systems cannot be used in conjunction with the tool changers known from the prior art or would require complicated remodeling to make this possible.

The objective of the invention is to propose a bending press and/or a loading device by means of which the problems known from the prior art can be solved and which in particular is characterized by a space-saving construction enabling existing bending presses and machines to be retro-fitted. The transfer device should extend between the bending press and loading device with as much protection as possible and shielded from dirt and other external influences. Maintenance, repair and replacement should be totally straight-forward.

This objective is achieved by means of a bending press and/or loading device of the type outlined above due to the fact that at least a portion of the transfer device is guided in the guide structure formed in the rail.

This feature enables a reliable guide system to be provided for the transfer device. The guide structure is provided in the rail with a view to retaining the transfer device in the rail. In addition to providing the guiding function along the longitudinal extension of the rail, the guide structure disposed inside the rail also fulfils a holding function because it holds the transfer device in (or inside) the rail. The transfer device is displaceable along the guide structure (i.e. parallel with the longitudinal extension of the rail) and is held by the guide structure in the direction perpendicular to the longitudinal extension of the rail (i.e. in the direction from the rail interior to the rail opening). The guide structure therefore prevents the transfer device from falling or jumping out of the rail.

A major advantage of the invention compared with the prior art outlined above is the fact that no separate rail or guide has to be provided for the transfer device, which significantly reduces the complexity of the construction. The bending tools inserted in the bending press and/or in the loading device are held in the same rail as that in which the transfer device or a portion of the transfer device is also inserted and held.

It is particularly preferable if guide structures already existing inside the rail can be used to guide the transfer device. This being the case, the principle proposed by the invention can also be used on existing machines without any or only slight modifications.

The principle proposed by the invention can be applied to both bending presses and loading devices. However, bending presses could also have a driven transfer device—independently of the presence of a loading device—which is used for pushing and exactly positioning a bending tool inside the tool holder. In the case of a combined arrangement, i.e. a loading device coupled with a bending press, the bending tools can be pushed from the tool holder of the loading device to the tool holder of the bending press and vice versa.

The bending press and/or loading device preferably have a control device by means of which the operation of pushing, feeding and/or changing the tools is automated. For this purpose, the control device is also connected to the drive of the transfer device (and optionally other drives of the loading device, e.g. for moving and displacing a bending tool storage which may optionally be provided).

One preferred embodiment is characterized by the fact that the bending tool is held in the rail by the same guide structure as that by which the at least one portion of the transfer device is guided. This is of particular advantage because a separate guide structure does not have to be provided for the transfer device. The bending tool is held by retaining means projecting out from the shaft of the bending tool for example, such as pegs, pins or rods. The retaining means extend into the guide structure, as a result of which the bending tool is held in the rail. The retaining means may also be displaceable and can be moved by an operating element of the bending tool (so-called safety pins) from a retaining into a releasing position, for example. This enables the bending tools to be inserted in a direction extending transversely to the longitudinal extension of the rail.

One preferred embodiment is characterized by the fact that the guide structure is provided by means of a region of the inner profile of the rail that is wider than the rail opening. The wider region may be provided in the form of oppositely lying grooves in the side walls of the rail, for example. The transfer device engages in this wider region, thereby effectively preventing the transfer device from falling out of the rail.

One preferred embodiment is characterized by the fact that the guide structure comprises at least one groove extending in an internal wall of the rail. As a result, the position of the transfer device inside the rail can be exactly defined, thereby enabling the transfer device to be moved reliably and with little friction.

One preferred embodiment is characterized by the fact that the guide structure is provided in the form of at least two oppositely lying grooves disposed in oppositely lying internal walls of the rail. This enables a stable and resistant mount to be provided inside the rail.

One preferred embodiment is characterized by the fact that the guide structure is provided in the form of discrete guide elements extending out from an internal wall into the interior of the rail and distributed in the longitudinal direction of the rail, and the bending press and/or loading device preferably has a clamping device for clamping the bending tool in the rail and the discrete guide elements are provided in the form of drivable clamping elements of the clamping device. In the case of this embodiment, existing structures can be used to guide and hold the transfer device, making this a particularly cost-effective variant.

Individual clamping elements or groups of clamping elements can preferably be controlled independently of other clamping elements so that clamping elements of the clamping device can be moved out into the interior of the rail in only certain regions. They can therefore be controlled in such a way that clamping elements in the region of the transfer device are temporarily extracted (and thus provide a guide here for the transfer device), whereas clamping elements in the region of a bending tool (to be moved) are retracted. The clamping elements are not moved into the clamping (i.e. extracted) position until the bending tool has been positioned.

One preferred embodiment is characterized by the fact that the portion of the transfer device guided by the guide structure is an elongate, preferably flexible, pull and/or push transmitting means, in particular a belt, a cable, a rod or a chain. The transfer device may therefore be based on a lightweight and compact design. The transmission means may be designed to transmit pull forces or push forces or pull and push forces. If the bending tools are fed in or changed from only one end of the rail, a pull and push transmitting means is used.

At least one line (cable, pressure or vacuum pressure line, media lines, etc.) is preferably run on or inside the pull and/or push transmitting means. These may be provided as a means of supplying an actuatable coupling for connecting to a bending tool.

One preferred embodiment is characterized by the fact that the pull and/or push transmitting means is wider than the rail opening and/or than the portion of the bending tool extending into the rail. This reliably prevents the pull and/or push transmitting means from falling out of the rail using simple means.

One preferred embodiment is characterized by the fact that the pull and/or push transmitting means guided in the guide structure extends for the most part, preferably entirely, inside the rail. The push and/or push transmitting means is therefore surrounded by the rail and/or is disposed—preferably completely—inside the inner profile of the rail. The pull and/or push transmitting means (e.g. a belt or a chain) is therefore afforded the best possible protection against external influences (dirt, mechanical effects). Furthermore, no additional space is needed to accommodate the pull and/or push transmitting means.

One preferred embodiment is characterized by the fact that the transfer device comprises a shuttle which is guided in the guide structure provided in the rail. A shuttle makes it easier to connect to the bending tool and may comprise at least one functional component, such as a coupling, a sensor (for detecting a bending tool), an illuminating device, etc.

One preferred embodiment is characterized by the fact that the shuttle is connected to the pull and/or push transmitting means at one of its ends and has a releasable coupling at its other end for connecting to a bending tool, the coupling preferably being a mechanical coupling, a magnetic coupling or a suction device. This enables a reliable connection to be established with the bending tool during the transfer.

One preferred embodiment is characterized by the fact that the shuttle is of a self-propelling design, in which case the drive is disposed in or on the shuttle. In this manner, the transfer device may be built with relatively few components. The shuttle may be activated by hard wiring or alternatively by radio.

One preferred embodiment is characterized by a number of tool holders which form a bending tool storage, and the tool holders can preferably be moved individually or in a co-operating unit relative to the transfer device. Accordingly, different tool holders can be moved along or through by means of the same transfer device.

One preferred embodiment is characterized by the fact that the loading device is a tool changer for changing one or more bending tools inserted in a bending press. Based on this variant, not only can the bending press be set up with bending tools, bending tools can also be returned (when no longer being used) from the bending press to the feeding device or tool changer. The tool changer is automated, i.e. connected to a control device which controls the displacement of the transfer device and/or operation of the coupling and optionally the movement of the bending tool storage relative to the transfer device.

One preferred embodiment is characterized by the fact that the bending tool storage is provided in the form of a shelf, a turntable, a transfer table, a drum, a paternoster elevator and/or one or more racks. Accordingly, a plurality of different bending tools can be made available and/or changed.

One preferred embodiment is characterized by at least two tool holders and one tool holder is the upper tool holder and the other tool holder is the lower tool holder.

The rail of the lower tool holder may have a simpler inner profile than that of the upper tool holder. In the rail of the lower tool holder, for example, the rail base together with the side walls may already fulfil the above-mentioned guiding function and holding function—the latter due to the fact that the transfer device is pushed against the rail base by force of gravity (i.e. the guide structure formed by the at least one internal wall assumes the holding function in conjunction with gravitational force). Accordingly, the rail inner profile of the lower tool holder may also have just a simple rectangular cross-section, for example.

The guide structure in the rail of the upper tool holder is designed to hold the at least one portion of the transfer device in the rail, i.e. secure it to prevent it from falling out. In other words, the guide structure in the rail of the upper tool holder opposes the force of gravity.

One preferred embodiment is characterized by the fact that the transfer device guided in the rail of one of the tool holders has a coupling for connecting to a bending tool inserted in the other (oppositely lying) tool holder. Based on this embodiment, therefore, a bending tool inserted in the oppositely lying tool holder can be gripped or held. In this instance, the transfer involves more than one tool holder.

The bending press and/or the loading device preferably comprises at least two tool holders (e.g. lower tool holders), which are disposed adjacent to one another in the direction extending transversely to the longitudinal direction of their rails, their rails being open in this same direction, and at least one other tool holder (e.g. upper tool holder), the rail of which lies opposite (i.e. facing) the rail of one of the adjacently disposed tool holders.

At least one of the tool holders is displaceable—relative to another tool holder—in a direction extending transversely (preferably substantially perpendicular) to the longitudinal direction of its rail and transversely (preferably substantially perpendicular) to the direction in which its rail opens. As a result, one of the two adjacently lying tool holders can be used as a "passing siding" or "sidetrack". In connection with the previous embodiment where the transfer device has a coupling for bending tools in the oppositely lying tool holder, complex changes of bending tools can be carried out in a simple manner. The two adjacently disposed tool holders (e.g. lower tool holders) are mounted on a common platform (e.g. table) or form a common platform. Accordingly, the platform can be displaced with both tool holders.

The bending press and/or loading device preferably have at least two transfer devices which can preferably be activated independently of one another. This being the case, one transfer device co-operates with the upper tool holder and one with the lower tool holder, as a result of which upper and lower tools can be positioned and/or changed simultaneously. Based on a design incorporating pull and/or push transmitting means, the latter extend in parallel in at least certain portions.

The objective of the invention is also achieved by means of a method for setting up a bending press with bending tools and/or for changing one or more bending tools inserted in a bending press using a loading device, whereby one or more bending tools are displaced by a transfer device between the tool holder of the loading device and the tool holder of the bending press, and the bending press and/or the loading device is/are of the type proposed by the invention and based on one of the embodiments described above.

One preferred embodiment is characterized by the fact that the bending tool is held in the rail of the tool holder of the bending press and/or in the rail of the tool holder of the loading device by the same guide structure as that by means of which the at least one portion of the transfer device is moved.

The objective of the invention is also achieved by an arrangement of a bending press and a loading device connected thereto for setting up the bending press with bending tools. The rail of the bending press tool holder and the rail of the loading device tool holder (connected to it) preferably have the same guide structure, preferably the same inner profile. The guide structure of the bending press rail merges—without any change in profile—into the guide structure of the loading device rail, thereby providing friction-free transit for the transfer device.

To provide a clearer understanding, the invention will be described in more detail below with reference to the appended drawings.

These are highly simplified, schematic diagrams illustrating the following.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

The embodiments illustrated as examples represent possible variants of the bending press and loading device, and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

Furthermore, individual features or combinations of features from the different embodiments illustrated and described may be construed as independent inventive solutions or solutions proposed by the invention in their own right.

The objective underlying the independent inventive solutions may be found in the description.

Above all, the individual embodiments of the subject matter illustrated in the drawings constitute independent solutions proposed by the invention in their own right. The objectives and associated solutions proposed by the invention may be found in the detailed descriptions of these drawings.

For the sake of good order, finally, it should be pointed out that, in order to provide a clearer understanding of the structure of the bending press and loading device, they and their constituent parts are illustrated to a certain extent out of scale and/or on an enlarged scale and/or on a reduced scale.

Figure 1:
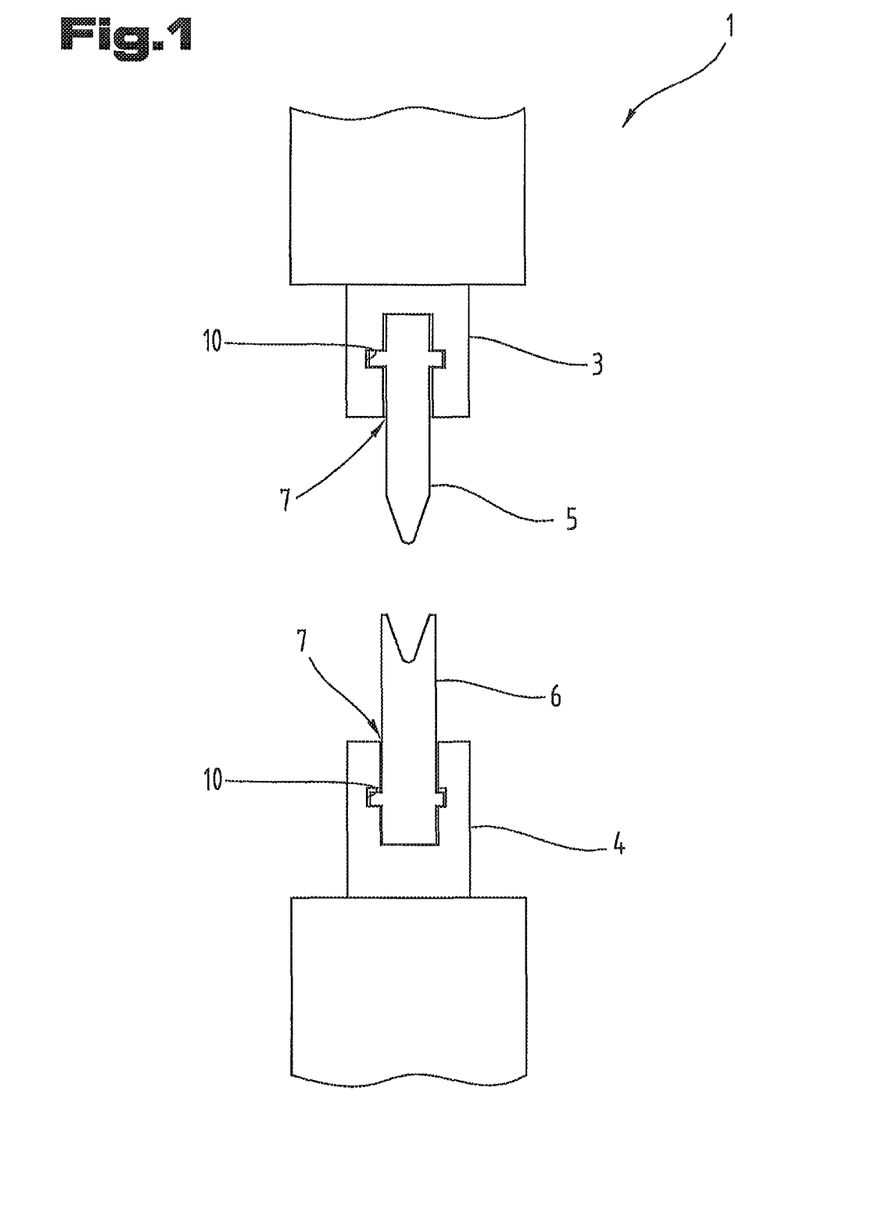
FIG. 1 a bending press proposed by the invention.

FIG. 1 illustrates a bending press 1 and it should be pointed out at this stage that a loading device 2 (FIG. 2) for setting up a bending press 1 with bending tools 5, 6 may likewise be provided and the following explanations may likewise apply to a loading device 2.

Figure 2:
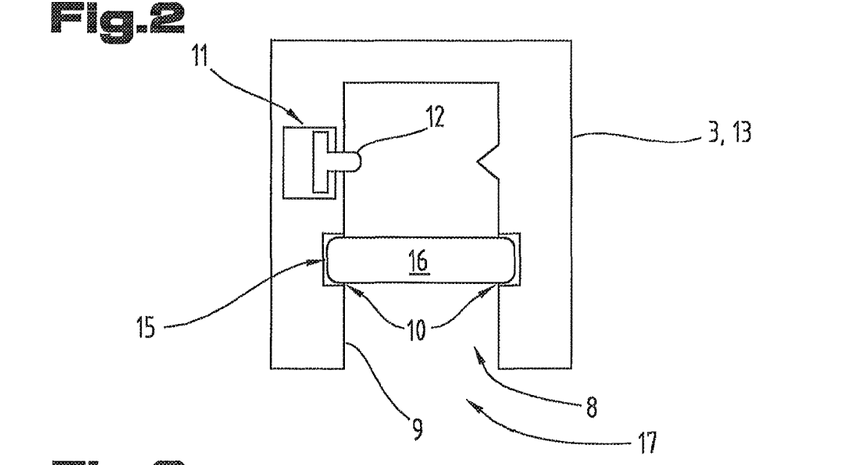
FIGS. 2 to 4 different variants of a rail inner profile with a transfer device extending therein.
Figure 6:
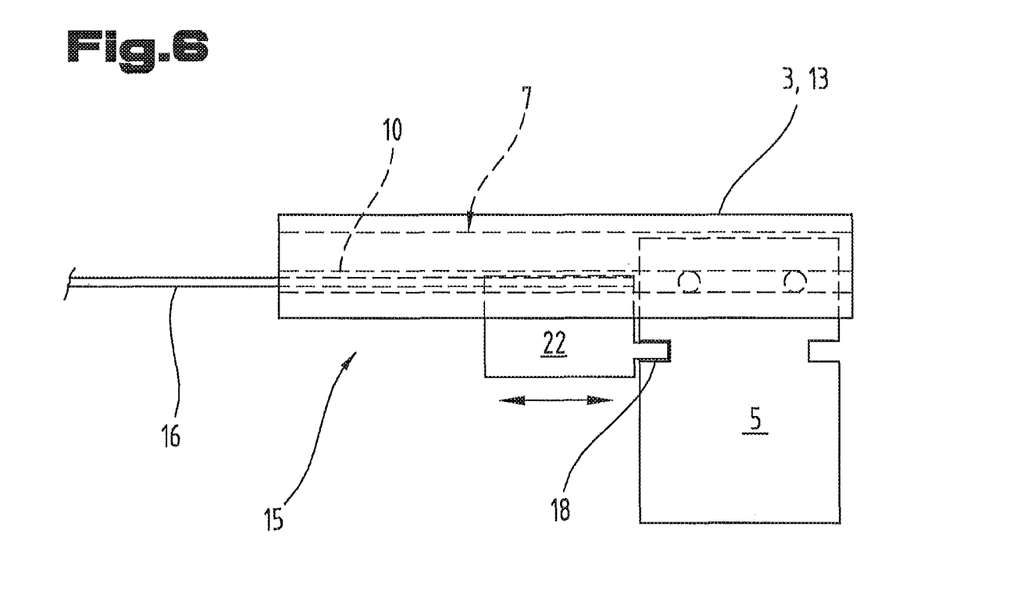
FIG. 6 a transfer device extending in the upper tool holder, comprising pull and/or push transmitting means and a shuttle which is coupled with an upper tool by means of a coupling.
Figure 7:
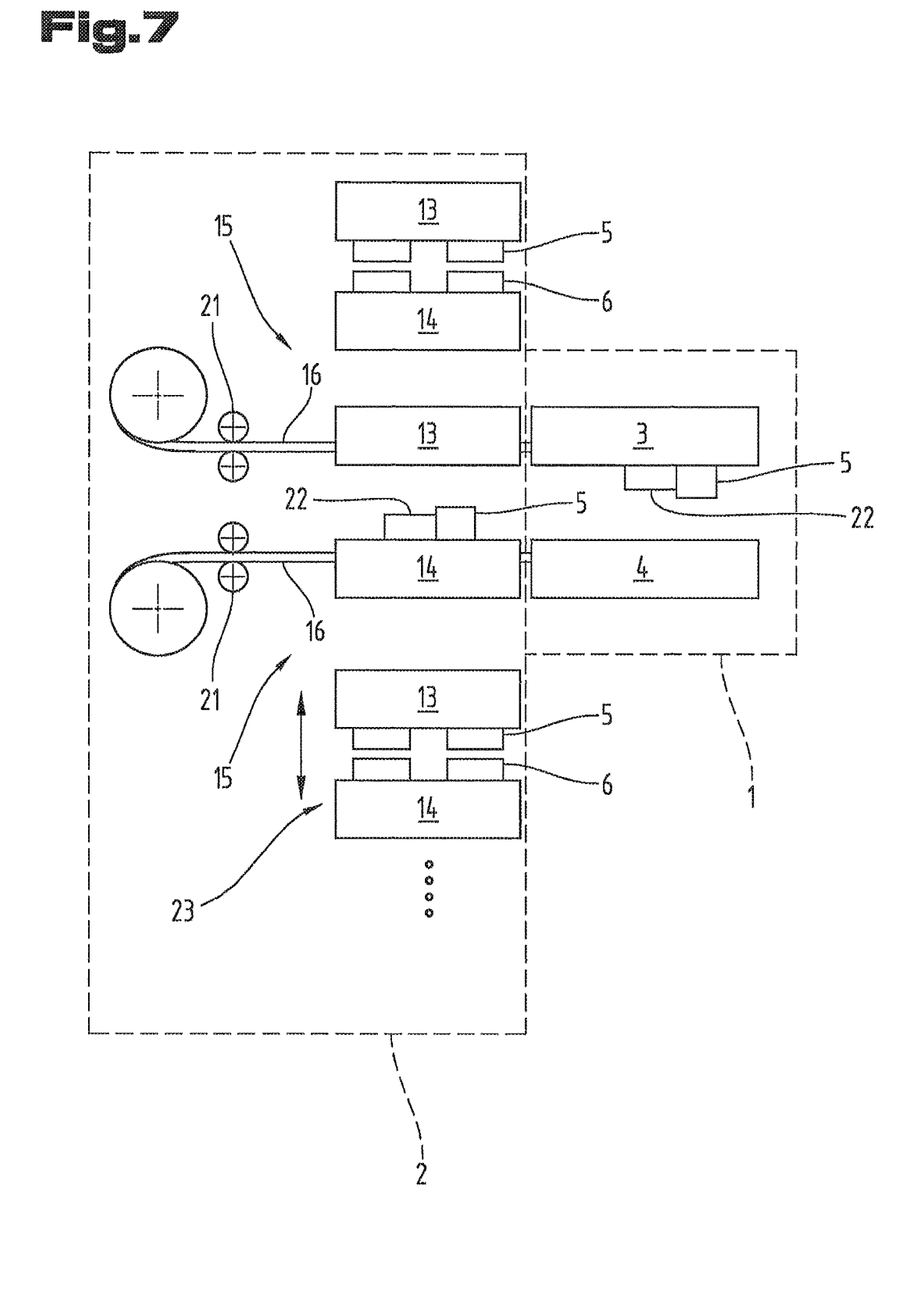
FIG. 7 an arrangement comprising a bending press and a loading device.

As may be seen from FIGS. 1, 6 and 7 in combination with FIG. 2, the bending press 1 and/or the loading device 2 has at least one tool holder 3, 4 respectively 13, 14 with a rail 7 having an inner profile 8 for receiving and moving a bending tool 5, 6.

As may be seen from FIG. 2, at least one internal wall 9 of the rail 7 forms a guide structure 10 extending in the longitudinal direction of the rail 7:

A transfer device 15 which can be moved along the longitudinal extension of the rail 7 by means of a drive 21 (FIG. 7) is used to move a bending tool 5, 6 inside the tool holder 3, 4 respectively 13, 14 and/or between the tool holder 13, 14 of the loading device 2 and a tool holder 3, 4 of the bending press 1.

The portion of the transfer device 15 guided by the guide structure 10 is an elongate, preferably flexible, pull and/or push transmitting means 16 (FIG. 6). This is provided as a belt in the drawings but may also be a cable, rod or chain.

As may be seen from FIG. 2 and FIG. 6, at least one portion of the transfer device 15 is guided by means of the guide structure 10 in the rail 7.

In the embodiment illustrated in FIG. 6, the bending tool 5 is held in the rail 7 by means of the same guide structure 10 as that in which the at least one portion of the transfer device 15 is guided.

Figure 4:
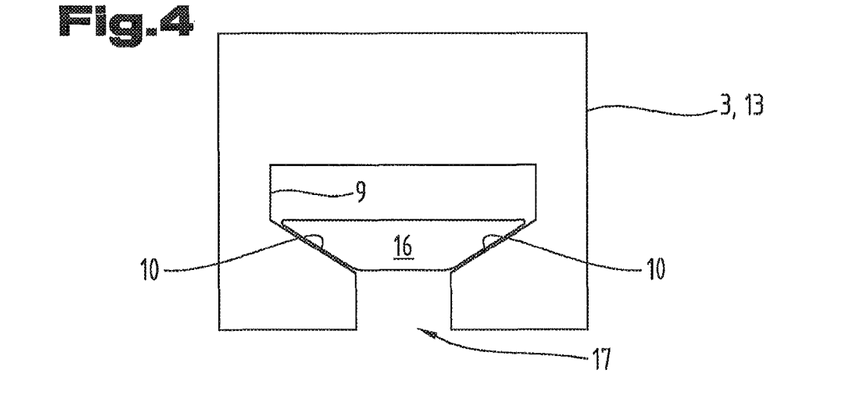

In the embodiments illustrated in FIGS. 2 and 4, the guide structure 10 is formed by a region of the inner profile 8 of the rail 7 that is wider than the rail opening 17. The pull and/or push transmitting means 16 is therefore wider than the rail opening 17 and/or than the portion of the bending tool 5, 6 extending into the rail 7.

In FIG. 2 the guide structure 10 comprises two grooves extending in oppositely lying internal walls 9 of the rail 7. The grooves are disposed opposite one another and the pull and/or push transmitting means 16 is inserted in the grooves.

In FIG. 4, the guide structure is provided in the form of a wedge-shaped section of the inner profile on which the pull and/or push transmitting means 16 sits.

Figure 3:
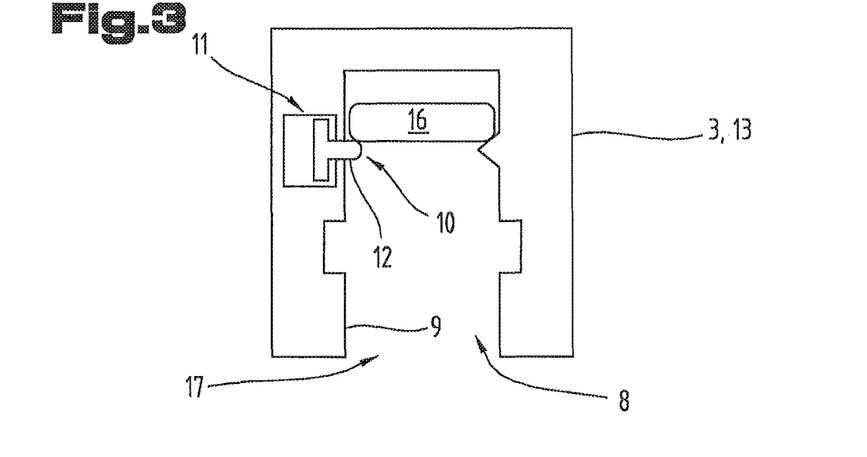

In FIG. 3, the guide structure 10 is provided in the form of discrete guide elements which extend out from an internal wall 9 into the interior of the rail 7 and are distributed in the longitudinal direction of the rail 7. In the embodiment illustrated, the bending press 1 and/or the loading device 2 has a clamping device 11 for clamping the bending tool 5, 6 in the rail 7. Accordingly, the discrete guide elements are provided as drivable clamping elements 12 of the clamping device 11. The clamping elements 12 can be moved from a position releasing the bending tool (i.e. retracted) into a clamping position (i.e. extracted), e.g. by means of a pressurizing device (indicated by a cylinder-piston arrangement in FIG. 3).

As illustrated by the embodiments shown in FIGS. 2, 3, 4 and 6, the pull and/or push transmitting means 16 guided in the guide structure 10 extends entirely inside the rail 7.

Figure 5:
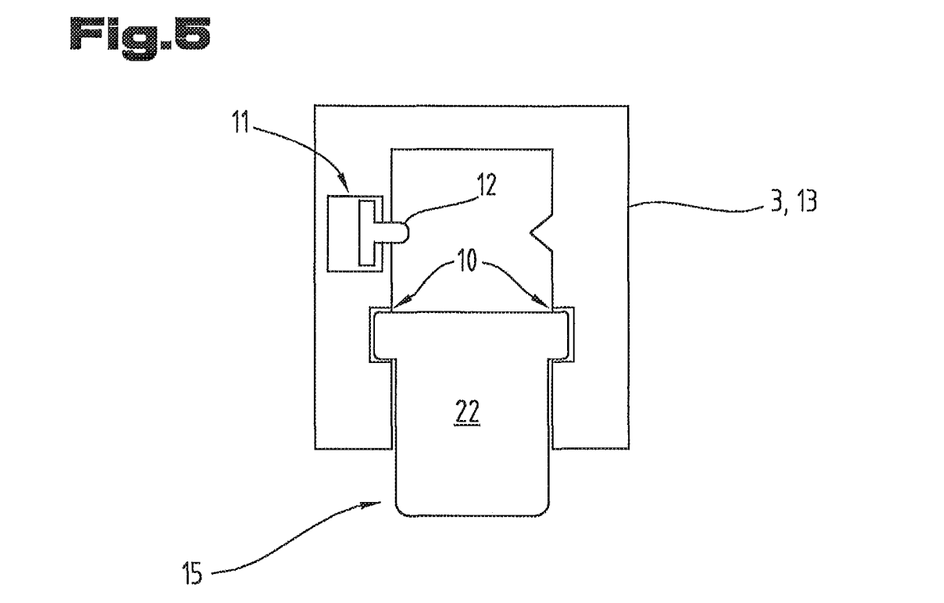
FIG. 5 a rail inner profile with a shuttle extending therein.

As illustrated in FIGS. 5, 6 and 7, the transfer device 15 comprises a shuttle 22 which is guided by the guide structure 10 in the rail 7. The shuttle 22 is connected to the pull and/or push transmitting means 16 at one of its ends and has a releasable coupling 18 at its other end for connecting to a bending tool 5, 6. The coupling 18 (only schematically illustrated in FIG. 6) may be a mechanical coupling, a magnetic coupling or a suction device. It may be based on the design disclosed in JP0584414U, in particular in FIG. 8. The coupling is capable of establishing a frictional and/or positively fitting connection with the bending tool.

In an alternative variant, the shuttle 22 could also be of a self-propelling design; this being the case, the drive for displacing the shuttle 22 may be disposed in or on the shuttle 22.

FIG. 7 illustrates an arrangement of a bending press 1 and a loading device 2 coupled with it for setting up the bending press 1 with bending tools 5, 6. The rail 7 of the bending press tool holders 3, 4 and the rail 7 of the loading device tool holders 13, 14 coupled therewith preferably have the same guide structure 10, preferably the same inner profile 8. In other words, the cross-section through the guide structure and inner profile are identical both on the bending press side and on the loading device side.

FIG. 7 illustrates a number of tool holders 13, 14 which form a bending tool storage 23 of the loading device 2. As indicated by the double arrow, the tool holders 13, 14 can be moved individually or as a co-operating unit relative to the transfer device 15 so that a transfer device 15 is able to move into different tool holders and move the bending tools stored there into the bending press 1. The loading device 2 in this instance is a tool changer for changing one or more bending tools 5, 6 inserted in a bending press 1. The bending tool storage 23 may be provided in the form of a shelf, a turntable, a transfer table, a drum, a paternoster elevator and/or one or more racks.

As may be seen from the drawings, the bending press 1 and/or loading device 2 comprises at least two tool holders 3, 4 respectively 13, 14, and one tool holder 3 respectively 13 is the upper tool holder and the other tool holder 4 respectively 14 is the lower tool holder.

The bending press 1 or loading device 2 illustrated in FIG. 7 comprises at least two transfer devices 15 which can preferably be activated independently of one another, one transfer device 15 co-operating with the upper tool holder 3 respectively 13 and one transfer device 15 co-operating with the lower tool holder 4 respectively 14.

Figure 8:
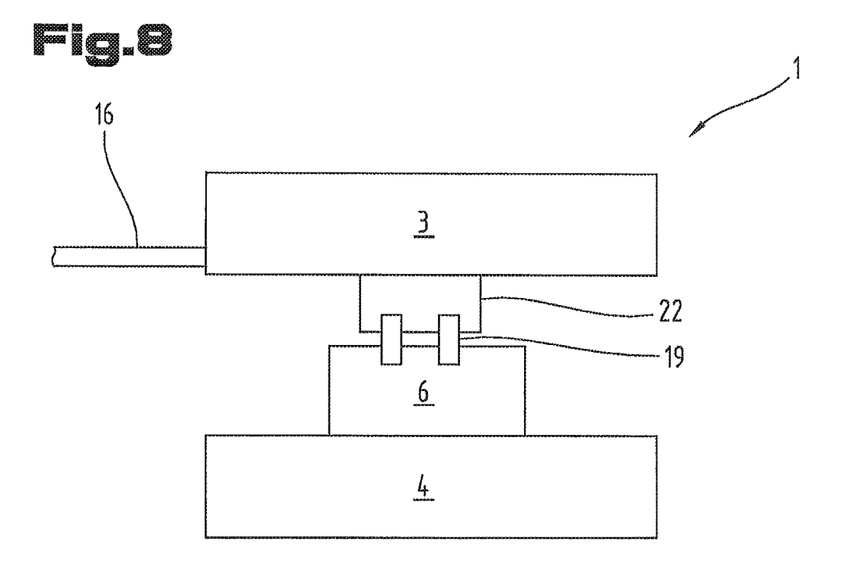
FIG. 8 a variant of a transfer device.

In the embodiment illustrated in FIG. 8, the transfer device 15 guided in the rail 7 of one of the tool holders (in this instance the upper tool holder 3) has a coupling 19 for connecting to a bending tool 6 inserted in the other tool holder (in this instance the lower tool holder 4). The coupling 19 may be similar to or based on a similar principle to the coupling 18 already described.

Figure 9:
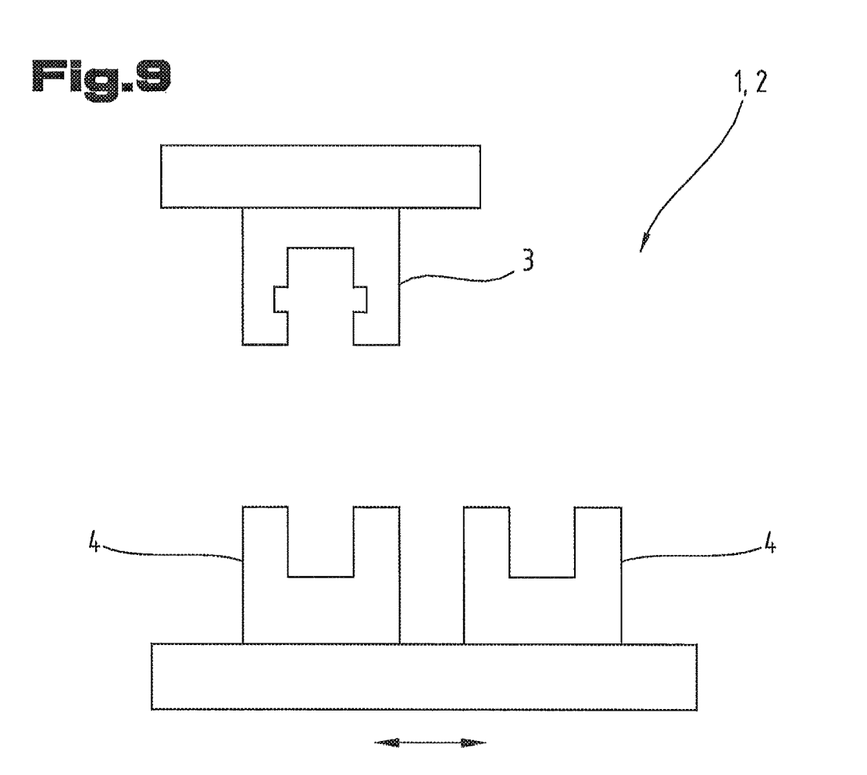
FIG. 9 a variant of a bending press and a loading device.

As illustrated in FIG. 9, the bending press 1 and/or the loading device 2 has at least two tool holders 4 (in this instance: for lower tools) which are disposed adjacent to one another in the direction extending transversely to the longitudinal direction of their rails 7, and their rails 7 open in the same direction. Another tool holder 3 (in this instance: for upper tools) is provided, the rail 7 of which lies opposite the rail 7 of one of the adjacently disposed tool holders 4.

The two adjacently disposed tool holders 4 are mounted on a common platform (or alternatively could form a common platform). The platform is displaceable relative to the upper tool holder 3 in a direction extending transversely or perpendicular to the longitudinal direction of its rail 7 and transversely or perpendicular to the direction in which its rail 7 opens.

As mentioned above, an automated loading device 2 is used for a method of setting up a bending press 1 with bending tools 5, 6 and/or changing one or more bending tools 5, 6 inserted in a bending press 1. Accordingly, one or more bending tools 5, 6 are moved by a transfer device 15 between the tool holder 13, 14 of the loading device 2 and the tool holder 3, 4 of the bending press 1. In this respect, the bending tool 5, 6 is held in the rail 7 of the tool holder 3, 4 of the bending press 1 and/or in the rail 7 of the tool holder 13, 14 of the loading device 2 by the same guide structure 10 as that by means of which the at least one portion of the transfer device 15 is moved.

LIST OF REFERENCE NUMBERS

1 Bending press
2 Loading device
3 Tool holder
4 Tool holder
5 Bending tool (upper tool)
6 Bending tool (lower tool)
7 Rail
8 Inner profile
9 Internal wall
10 Guide structure
11 Clamping device
12 Clamping element
13 Tool holder
14 Tool holder
15 Transfer device
16 Pull and/or push transmitting means
17 Rail opening
18 Coupling
19 Coupling
20 Pin
21 Drive
22 Shuttle
23 Bending tool storage

The invention claimed is:

1. An apparatus comprising:
at least one tool holder with a rail having an inner profile for receiving and for allowing displacement of a bending tool, at least one internal wall of the rail forming a guide structure extending in the longitudinal direction of the rail;
and at least one transfer device drivable by a drive for displacing the bending tool within the at least one tool holder and/or from the at least one tool holder,
wherein at least one portion of the at least one transfer device is guided by the guide structure formed in the rail; and
wherein the at least one transfer device and the bending tool, or the at least one portion of the at least one transfer device and the bending tool, are held in the rail.

2. The apparatus according to claim 1, wherein the at least one transfer device is displaceable along the guide structure parallel with the longitudinal direction of the rail and, in a direction perpendicular to the rail, is held by the guide structure in the direction from the rail interior towards an opening of the rail.

3. The apparatus according to claim 1, wherein the bending tool is held in the rail by the same guide structure as that by which the at least one portion of the at least one transfer device is guided.

4. The apparatus according to claim 1, wherein the guide structure is formed by a region of the inner profile of the rail that is wider than an opening of the rail.

5. The apparatus according to claim 1, wherein the guide structure comprises at least one groove extending in the at least one internal wall of the rail.

6. The apparatus according to claim 5, wherein the at least one internal wall of the rail comprises oppositely lying internal walls of the rail, and wherein the guide structure is formed by at least two oppositely lying grooves disposed in the oppositely lying internal walls of the rail.

7. The apparatus according to claim 1, wherein the guide structure is provided in the form of discrete guide elements extending out from the at least one internal wall into the interior of the rail and distributed in the longitudinal direction of the rail.

8. The apparatus according to claim 7, wherein the apparatus has a clamping device for clamping the bending tool in the rail and the discrete guide elements are provided in the form of drivable clamping elements of the clamping device.

9. The apparatus according to claim 1, wherein the portion of the at least one transfer device guided by the guide structure is an elongate pull and/or push transmitter.

10. The apparatus according to claim 9, wherein the pull and/or push transmitter is wider than an opening of the rail and/or than the portion of the bending tool extending into the rail.

11. The apparatus according to claim 9, wherein the pull and/or push transmitter guided in the guide structure extends at least partly inside the rail.

12. The apparatus according to claim 9, wherein the pull and/or push transmitter comprises a belt, a cable, a rod or a chain.

13. The apparatus according to claim 9, wherein the pull and/or push transmitter guided in the guide structure extends entirely inside the rail.

14. The apparatus according to claim 1, wherein the at least one transfer device comprises a shuttle which is guided in the guide structure provided in the rail.

15. The apparatus according to claim 14, wherein the shuttle comprises at least one functional component.

16. The apparatus according to claim 14, wherein the shuttle is connected to the pull and/or push transmitter at one end of the shuttle, and the shuttle has a releasable coupling at an opposite end of the shuttle, which releasable coupling is configured for connecting to a bending tool.

17. The apparatus according to claim 16, wherein the releasable coupling is a mechanical coupling, a magnetic coupling or a suction device.

18. The apparatus according to claim 14, wherein the shuttle comprises a coupling.

19. The apparatus according to claim 1, wherein a number of tool holders form a bending tool storage and the tool holders of the bending tool storage can be moved individually or in a co-operating unit relative to the at least one transfer device.

20. The apparatus according to claim 19, wherein the bending tool storage is provided in the form of a shelf and/or one or more racks.

21. The apparatus according to claim 1, wherein the apparatus is a loading device for loading a bending press with bending tools.

22. The apparatus according to claim 21, wherein the loading device is a tool changer for changing one or more of the bending tools inserted in a bending press.

23. The apparatus according to claim 1, wherein the at least one tool holder comprises at least two tool holders, wherein one of the at least two tool holders is an upper tool holder and the other of the at least two tool holders is a lower tool holder.

24. The apparatus according to claim 23, wherein the at least one transfer device guided in the rail of the one of the at least two tool holders has a coupling for connecting to a bending tool inserted in the other of the at least two tool holders.

25. The apparatus according to claim 1, wherein the at least one tool holder comprises at least two tool holders which are disposed adjacent to one another in a direction extending transversely to the longitudinal direction of their rails, and
wherein their rails open in the same direction, and
wherein the at least one tool holder further comprises at least one further tool holder, the rail of which lies opposite the rail of one of the adjacently disposed tool holders.

26. The apparatus according to claim 25, wherein at least one of the at least two adjacently disposed tool holders is displaceable in the direction extending transversely to the longitudinal direction of its rail and transversely to the direction in which its rail opens.

27. The apparatus according to claim 25, wherein the two adjacently disposed tool holders are mounted on a common platform or form a common platform which can be displaced relative to the at least one further tool holder.

28. The apparatus according to claim 1, wherein the at least one tool holder comprises an upper tool holder and a lower tool holder, and wherein the at least one transfer device comprises at least two transfer devices which can be activated independently of one another, wherein one of the at least two transfer devices is associated with the upper tool holder and one of the at least two transfer devices is associated with the lower tool holder.

29. The apparatus according to claim 1, wherein the portion of the at least one transfer device guided by the guide structure is an elongate flexible pull and/or push transmitter.

30. A method for setting up a bending press with bending tools using the apparatus as defined in claim 1, wherein one or more bending tools are displaced by the at least one transfer device between the at least one tool holder and a further tool holder, wherein the further tool holder is a tool holder of the bending press.

31. The method according to claim 30, wherein the at least one portion of the at least one transfer device is movable through the guide structure, and wherein the one or more bending tools are held in the rail of the at least one tool holder by the same guide structure as that through which the at least one portion of the at least one transfer device is moved.

32. A combination of a bending press and a loading device coupled therewith for setting up the bending press, the combination including the apparatus according to claim 1, wherein the loading device comprises the at least one transfer device, and wherein the at least one tool holder is part of the bending press, is part of the loading device, or is part of the bending press and the loading device.

33. A bending press and at least one transfer device,
the bending press comprising:
at least one tool holder with a rail having an inner profile for receiving and for allowing displacement of a bending tool, at least one internal wall of the rail forming a guide structure extending in the longitudinal direction of the rail;
the at least one transfer device being drivable by a drive for displacing the bending tool within the at least one tool holder and/or from the at least one tool holder;
wherein at least one portion of the at least one transfer device is guided by the guide structure formed in the rail; and
wherein the at least one transfer device and the bending tool, or the at least one portion of the at least one transfer device and the bending tool, are held in the rail.

* * * * *